(12) United States Patent
Stierle et al.

(10) Patent No.: US 6,513,831 B2
(45) Date of Patent: Feb. 4, 2003

(54) METHOD AND SYSTEM FOR COMMUNICATING BETWEEN SENSORS AND A SUPPLEMENTAL RESTRAINT SYSTEM CONTROLLER

(75) Inventors: Thomas Stierle, Auburn Hills, MI (US); Reinhart Weber, Regensburg (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/843,538

(22) Filed: Apr. 25, 2001

(65) Prior Publication Data

US 2001/0052695 A1 Dec. 20, 2001

Related U.S. Application Data

(60) Provisional application No. 60/199,450, filed on Apr. 25, 2000.

(51) Int. Cl.[7] ............................................... B60R 21/32
(52) U.S. Cl. ........................................ 280/735; 280/734
(58) Field of Search .............................. 280/734, 735, 280/730.2, 730.1

(56) References Cited

U.S. PATENT DOCUMENTS

| | | | |
|---|---|---|---|
| 4,410,875 A | * | 10/1983 | Spies et al. ................. 180/274 |
| 5,315,299 A | | 5/1994 | Matsumoto |
| 5,430,649 A | * | 7/1995 | Cashler et al. ............... 180/274 |
| 5,484,166 A | * | 1/1996 | Mazur et al. ............. 280/730.2 |
| 5,620,202 A | * | 4/1997 | Gray et al. ............... 280/730.2 |
| 5,899,949 A | | 5/1999 | Kincaid |
| 6,076,028 A | * | 6/2000 | Donnelly et al. .............. 701/45 |
| 6,226,578 B1 | * | 5/2001 | Willerton et al. ............ 280/734 |

FOREIGN PATENT DOCUMENTS

| | | |
|---|---|---|
| DE | 3811217 A1 | 10/1989 |
| DE | 4425845 A1 | 1/1996 |
| DE | 19643502 A1 | 4/1998 |
| DE | 19743914 A1 | 11/1998 |

* cited by examiner

*Primary Examiner*—Brian L. Johnson
*Assistant Examiner*—Kelly E Campbell

(57) ABSTRACT

A system and method for communicating between a single electronic controller and multiple sensor devices in a vehicle supplemental restraint system includes a unique communication protocol. A series of pulses, each having a chosen duration, are communicated between the sensor device and the controller. The combined sequence and duration of each pulse provides a unique piece of information to the controller regarding the condition sensed by each sensor device, respectively. By controlling the sequence and duration of pulses, each sensor device is able to provide unique information to the controller, which responsively controls the supplemental restraint device as needed.

12 Claims, 2 Drawing Sheets

METHOD AND SYSTEM FOR COMMUNICATING BETWEEN SENSORS AND A SUPPLEMENTAL RESTRAINT SYSTEM CONTROLLER

CROSS REFERENCE TO RELATED APPLICATIONS

This application claims priority to U.S. Provisional Application No. 60/199,450, which was filed on Apr. 25, 2000.

BACKGROUND OF THE INVENTION

This invention generally relates to supplemental restraint systems. More particularly, this invention relates to a communication protocol for communicating information between sensors and controllers in supplemental restraint systems.

Supplemental restraint systems have recently gained increasing popularity in vehicles. The use of supplemental restraint devices such as air bags has been recognized as an advantage for preventing injury and preserving lives in the event of a vehicle crash. As technology has advanced, there have been additional proposals for additional supplemental restraint systems within vehicles. With the addition of each such device, additional communication is required between a controller and the device.

There have also been developments for including additional sensors on a vehicle for better detecting vehicle impact conditions. Moreover, with the increase of supplemental restraint devices, increased number of sensors are required for controlling each device. There is a need for effective communication between the various sensors or devices and the controller, which is responsible for deploying the supplemental restraint device as needed.

The need for communication between additional devices and sensors is coupled with the desire to maintain vehicle systems as simple, robust and economic as possible. Supplemental restraint systems, like most auxiliary systems incorporated into vehicles, must fit within space constraints and be cost effective.

This invention provides a communication protocol that facilitates communication between a single controller and multiple sensors or devices in a supplemental restraint system.

SUMMARY OF THE INVENTION

In general terms, this invention is a system for controlling a supplemental restraint device in a vehicle using a simple and robust yet versatile communication protocol between the various devices of the supplemental restraint system. The inventive arrangement includes a plurality of sensor devices supported at peripheral locations on the vehicle. A controller that communicates with the sensor devices interprets a series of pulses that each have a chosen duration to determine a condition sensed by the sensor devices based upon the duration and sequence of the pulses. Each sensor device preferably provides a unique series of pulses to be interpreted by the controller providing information regarding the unique condition sensed by each sensor.

The preferred arrangement includes a data portion within the controller, such as a look up table, that enables the controller to make a determination of the condition sensed by the sensor and to responsively control the supplemental restraint device as needed.

A method of this invention includes communicating between a peripheral sensor device and an electronic controller in a vehicle safety system. The method includes generating a plurality of pulses in a series responsive to a condition sensed by the sensor device. Each pulse has a chosen duration such that the sequence and durations of the pulses are indicative of the sensed condition. The combination of the order in which the pulses are received and their respective durations provides unique information regarding the condition detected by the sensor device. The condition sensed by the sensor device is determined by the electronic controller based upon the duration and sequence of the pulses. The electronic controller is then able to responsively control the operation of the supplemental restraint device needed.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
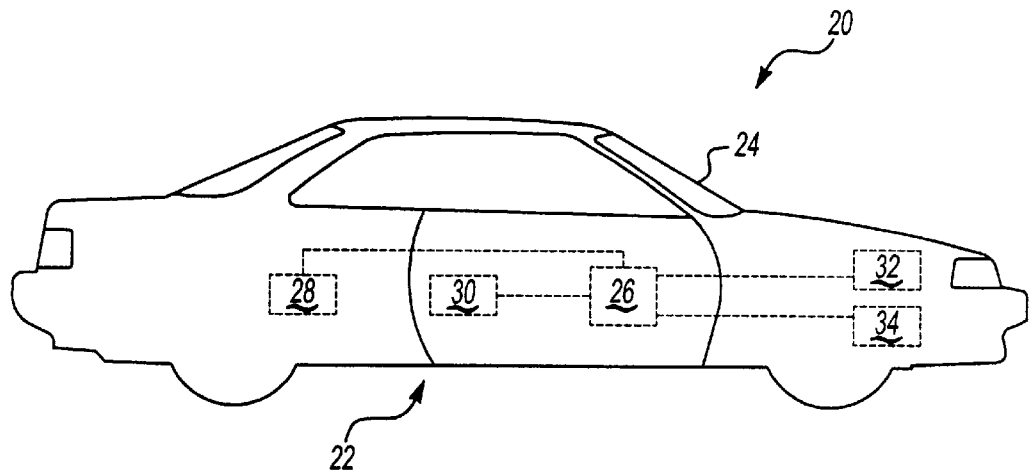
FIG. 1 schematically illustrates a system designed according to this invention.

A vehicle 20 includes a supplemental restraint system 22. At least one supplemental restraint device 24 such as an air bag is operated responsive to conditions experienced by the vehicle such as impact, for example. A controller 26 controls the operation or deployment of the supplemental restraint device 24. Although one air bag 24 is schematically illustrated in FIG. 1, those skilled in the art will recognize that a system designed according to this invention is effective for controlling a plurality of air bags or other safety devices within a vehicle.

A plurality of peripheral sensing devices 28, 30, 32 and 34 provide information to the controller 26 regarding the conditions of the portions of the vehicle in the vicinity of each sensor device. The illustrated example includes electronic front sensors 32 and 34. The communication protocol of this invention allows the single controller 26 to receive information from all of the peripheral sensors and to readily interpret that information to control the supplemental restraint devices within the supplemental restraint system 22 as needed.

Four peripheral sensor devices are schematically illustrated in FIG. 1, however, this invention is not limited to that number of sensor devices and, is intended to be used with more than four sensor devices. Regardless of the type of sensor device, the communication protocol of this invention can be readily implemented to provide effective communication between a single controller 26 and multiple sensor devices.

Figure 2:
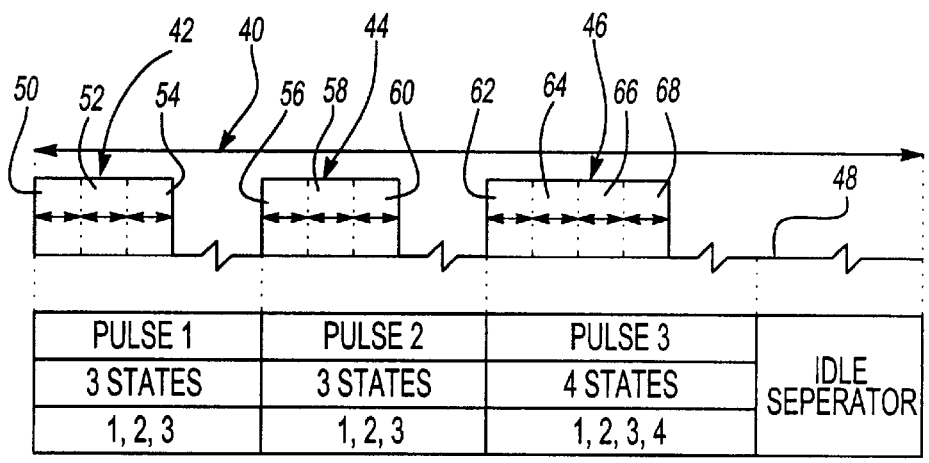
FIG. 2 is a timing diagram illustrating features of the communication protocol of this invention.

FIG. 2 graphically illustrates a communication signal 40 that includes a plurality of pulses 42, 44 and 46. An idle separator portion 48 follows the last pulse 46 of the series. By controlling the duration of each pulse and the sequence in which the pulses are communicated from the sensor devices to the controller provides a unique identification for each communication signal 40.

The illustrated example shows how the duration of each pulse may be controlled. The pulse 42 contains three timing segments 50, 52 and 54. In other words, the pulse 42 has three possible states. A first state where the timing segment 50 is active (i.e., where the pulse 42 provides a positive or HIGH logic signal) provides a first pulse duration for the first pulse 42 within the series 42, 44 and 46. If the first timing segment 50 and the second timing segment 52 are active, then the pulse 42 has a second duration. Similarly, when all three timing segments are active, the pulse 42 has a third duration.

The pulse 44 in the illustrated example also has three possible states because there are three timing segments, 56, 58 and 60, which may be active depending on the desired duration of the pulse 44. The pulse 46 preferably includes four timing segments 62, 64, 66 and 68. Therefore, the possible duration of the pulse 46 exceeds that of the pulses 42 and 44. The preferred embodiment includes providing the least significant pulse 42 as the first pulse in a series of pulses.

Figure 3:
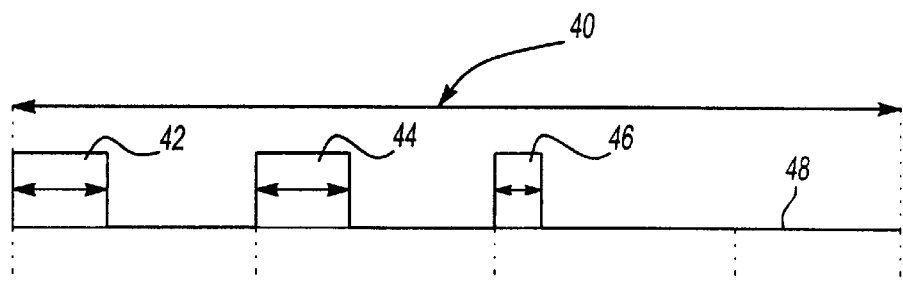
FIG. 3 is an example series of pulses having chosen durations according to this invention.

The illustration of FIG. 3 shows a communication signal that includes a first pulse 42 having the timing segments 50 and 52 active, the second pulse 44 having the timing segments 56 and 58 active and the third pulse 46 having the timing segment 62 active.

The time duration of each pulse and the overall length of the communication signal 40 may by varied depending upon the needs of a particular situation. In one example, each timing segment of the pulses is 32 microseconds. In this example, the preferred window within which each pulse is generated is 290 microseconds. The duration of the idle separator portion 48 preferably is 130 microseconds. These timing choices provide a recognizable distinction between the pulses and the idle separator portion 48 so that a single communication signal 40 is recognizable by the controller 26.

In the example of the preceding paragraph, a value for the communication signal 40 may be determined. This value can be calculated from the following equation, for example:

$$\text{Value} := \text{round}\left(\frac{\text{time}_{Pulse1}}{36\ \mu s}\right) + \text{round}\left(\frac{\text{time}_{Pulse2}}{36\ \mu s}\right) * 3 + \text{round}\left(\frac{\text{time}_{Pulse3}}{36\ \mu s}\right) * 9 - 13$$

In another example, when the first timing segment of each pulse is active (i.e., timing segment 50 or 56) the pulse duration preferably is 44 microseconds. When the first two timing segments of a pulse are active, the preferred pulse duration is 74 microseconds. When three timing segments are active, the preferred pulse duration is 108 microseconds. If all four timing segments of the pulse 46 are active, the preferred pulse duration is 144 microseconds. This example includes a 1 KHz repetition rate and the capability to provide twenty-two different messages using three pulses per series or signal 40.

Those skilled in the art will be able to determine the appropriate pulse durations to achieve the versatility and level of accuracy required to operate a particular system and to accommodate the resolution and memory capability of a particular controller. Those who have the benefit of this description will be able to choose appropriate timing constraints and to appropriately program a controller to achieve the results provided by this invention.

The combined sequence and durations of the pulses for each communication signal provides a unique identifier to the controller 26 regarding the condition sensed by each sensor device, respectively. The preferred arrangement includes selecting the sequence and duration of the pulses to be such that a possible misinterpretation by the controller will not result in an unexpected or undesirable operation of the supplemental restraint system. In other words, the hamming distance between the values assigned to the different communication signals (i.e., a series of pulses each having a chosen duration in a chosen order) is such that the controller will not inaccurately control the supplemental restraint system.

The currently preferred embodiment provides for the controller to determine a variety of information from each sensor, such as identity, status, verification and the severity level of a condition sensed by the sensor device. In one example, fifteen different severity levels are readily accommodated using the multiple pulse sequence with chosen durations of this invention. The controller preferably controls the manner of supplemental restraint device operation depending on the severity level of the message.

Figure 4:
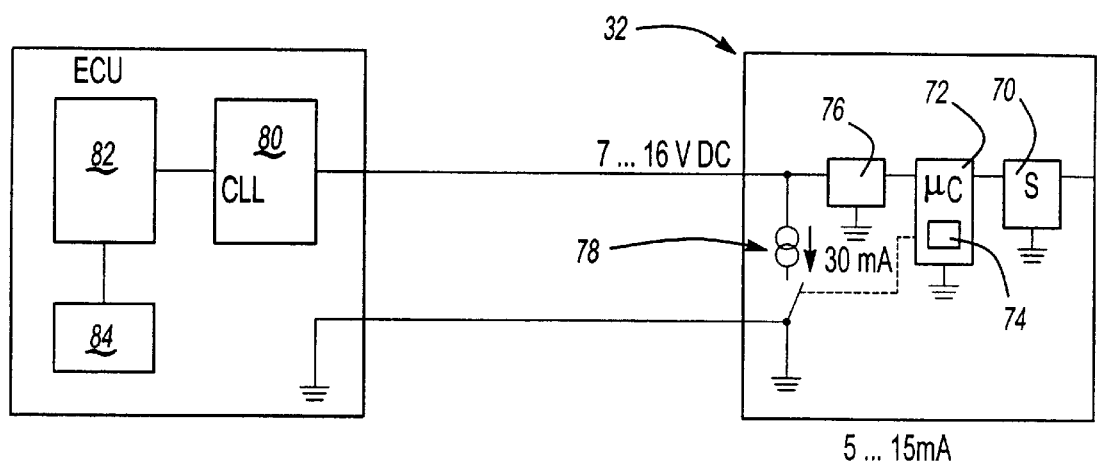
FIG. 4 schematically illustrates more details of the system designed according to this invention.

FIG. 4 schematically illustrates somewhat more detail of the system 22. An example sensor device 32 is shown having a sensor portion 70 that detects a condition of the vehicle during an impact, for example. Such sensors are known in the art. A microcontroller portion 72 preferably includes a memory module 74 that contains interpretive information for interpreting the signals received from the sensor portion 70. One example memory module 74 is a look up table from which the microcontroller 72 determines the sequence and duration of the pulses to communicate to the controller 26 to provide a message indicating the sensed condition. The sensor device 32 preferably includes a power source portion 76 for powering the microcontroller portion 72 and the sensor portion 70.

The microcontroller portion 72 controls the sequence and duration of the pulses by controlling a current absorbing device 78. In the preferred arrangement, the sensor device 32 draws power from the controller 26. By appropriately manipulating the current absorbing device 78, the amount of current drawn by the device 32 is increased. An increase of current draw corresponds to an activation of a pulse.

A current logic level portion 80 within the controller 26 preferably monitors the amount of current drawn by each sensor device. Whenever the amount of current exceeds a base current level, which in one example is 10 milliamps, the current logic level portion 80 provides a signal to the controller portion 82, which corresponds to a logical HIGH. The duration of the logical HIGH signal corresponds to the duration of time during which increased current is drawn by the sensor device 32. The microcontroller 72 controls that period of time to control the duration of each pulse.

Determining the pulse content or duration may be accomplished in several ways. In one example, the controller 82 is programmed to recognize the rising and falling edge of each pulse. The controller 82 then determines the pulse length based on the time between the falling and rising edges.

In another example an asynchronous serial interface such as a UART decoder samples the signal and translates the pulse series into a series of bytes. The translated bytes then are deciphered within the controller 82 to determine the message content.

The controller portion 82 preferably utilizes a memory module 84, which contains interpretive information so that the series and duration of pulses are meaningful to the controller portion 82. In one example, the memory portion 84 includes a look up table that corresponds to the various identity, status and severity level messages communicated between the sensor devices and the controller 26.

The preceding description is exemplary rather than limiting in nature. Example characteristics of a system and method according to this invention have been disclosed. Variations and modifications to the disclosed examples may become apparent to those skilled in the art that do not depart from the essence of this invention. The scope of legal protection given to this invention can only be determined by studying the following claims.

We claim:

1. A method of communicating between an electronic sensor having a sensor portion, a sensor controller and a current absorbing portion and an electronic controller in a vehicle safety system, comprising the steps of:

generating a plurality of pulses in a series responsive to a condition sensed by the sensor by selectively controlling the current absorbing portion responsive to the condition sensed by the sensor portion, each pulse having a chosen duration such that the sequence and durations of the pulses are indicative of the sensed condition;

powering the sensor using the sensor controller and determining an amount of time that an amount of current exceeding a chosen threshold is drawn by the sensor from the controller to determine the pulse durations; and determining a condition sensed by the sensor using the electronic controller based upon the duration and sequence of the pulses.

2. The method of claim 1, including controlling the vehicle safety system responsive to the determined condition.

3. The method of claim 2, including determining whether the determined condition has a severity beyond a chosen threshold and deploying a supplemental restraint device when the determined condition severity exceeds the threshold.

4. The method of claim 3, including controlling the manner of deployment of the supplemental restraint device based upon the determined severity.

5. The method of claim 1, including establishing a set number of pulses included in the series and generating a separator signal portion in between successive series.

6. The method of claim 5, including generating three pulses in the series and assigning a duration to each of the pulses from one of at least three preselected durations.

7. The method of claim 6, including assigning a duration to one of the pulses from one of at least four preselected durations.

8. A system for controlling a supplemental restraint device in a vehicle comprising:

a plurality of sensor devices supported at peripheral locations on the vehicle each sensor device having a sensor portion that generates an electrical signal responsive to a condition of the vehicle, a current absorbing portion and a microprocessor portion that controls the current absorbing portion to thereby generate a series of pulses based upon the electrical signal from the sensor portion, the microprocessor determining an amount of current drawn by the sensor portion and responsively controlling the current absorbing portion such that the duration and sequence of the pulses is indicative of the condition sensed by the sensor portion; and a controller that communicates with the sensor devices by interpreting the series of pulses that each have a chosen duration to determine a condition sensed by the sensor devices based upon the duration and sequence of the pulses.

9. The system of claim 8, wherein the sensor devices each comprise an electronic front sensor that senses a collision event condition.

10. The system of claim 8, wherein the controller determines a severity level of the condition sensed by at least one of the sensing devices and controls deployment of a supplemental restraint device based upon the determined severity level.

11. The system of claim 8, wherein the controller includes a memory portion that contains information that correlates a plurality of condition severity levels to specific pulse duration sequences.

12. A method of communicating between a peripheral sensor device and an electronic controller in a vehicle safety system, comprising the steps of:

generating a plurality of pulses in a series responsive to a condition sensed by the sensor device, each pulse having a chosen duration such that the sequence and durations of the pulses are indicative of the sensed condition;

establishing a set number of pulses included in the series;

generating a separator signal portion in between successive series; and determining a condition sensed by the sensor device using the electronic controller based upon the duration and sequence of the pulses.

* * * * *